UNITED STATES PATENT OFFICE.

HENRY C. FREIST, OF PHILADELPHIA, PENNSYLVANIA, ASSIGNOR, BY DIRECT AND MESNE ASSIGNMENTS, OF THREE-FOURTHS TO JOSEPH MORWITZ, OF SAME PLACE.

CASEIN PAINT.

SPECIFICATION forming part of Letters Patent No. 416,100, dated November 26, 1889.

Application filed March 26, 1889. Serial No. 304,860. (No specimens.)

*To all whom it may concern:*

Be it known that I, HENRY C. FREIST, a citizen of the United States, residing in the city and county of Philadelphia, and State of Pennsylvania, have invented a new and useful Composition of Matter for Painters' Use, for a Sizing Material for Paper Makers, for Priming Walls, and for other Purposes, of which the following is a specification.

My compound consists of oxide of lead, of chloride of sodium, or the chloride of other alkali or alkaline earth, of water, and of casein or milk-curd, to which compound may be added oil, coloring, or other matter, as may be found desirable or necessary in view of the use to which the compound is to be put.

In the manufacture of the foregoing compound, oxide of lead and chloride of sodium, or oxide of lead and the chloride of an alkali or alkaline earth, and water, are mixed together by trituration or in any other suitable manner, with the result that a chloride of lead or basic chloride of lead, and a caustic alkali or caustic alkaline earth are formed.

In the foregoing operation, it is to be understood that the water employed may be mixed with the chloride of the alkali or alkaline earth before the admixture of said alkali or alkaline earth with the oxide of lead, or that it may be added to the mass after the chloride of the alkali or alkaline earth and the oxide of lead have been mixed together. The mixture thus produced is then admixed with milk-curd or casein, with the result that the albuminous and glutinous matter of the casein is dissolved by the caustic alkali or caustic alkaline earth.

I have found that the composition of matter above referred to may be made by the use of seven pounds of oxide of lead, one pound of chloride of sodium, seven pounds of water, and twenty-eight pounds of casein. I do not, however, confine myself to these proportions or quantities as they may be varied or departed from provided, however, that the proportions of the ingredients named employed result in the solution by the water of the chloride of sodium, in the conversion of the oxide of lead into a chloride of lead or into a basic chloride of lead, in the solution of the glutinous and albuminous matter contained in the casein, and in the production of a sufficiently fluid condition of the compound for the purpose for which it is to be used.

The compound made in accordance with the practice of my invention as above described may be used either with or without the addition of oil, may be colored at will by adding coloring material; and may be thinned or made of any desired consistency by the addition of water or of oil or of both oil and water.

Having thus described my invention, I claim:

1. A compound for painters' use, and for other purposes, consisting of oxide of lead, chloride of sodium or chloride of an alkali or alkaline earth, and casein.

2. A compound for painters' use, and for other purposes, consisting of oxide of lead, chloride of sodium or chloride of an alkali or alkaline earth, casein, and water.

3. A compound for painters' use, and for other purposes, consisting of oxide of lead, chloride of sodium or chloride of an alkali or alkaline earth, water, casein, and oil.

In testimony that I claim the foregoing as my invention I have hereunto signed my name this 20th day of March, A. D. 1889.

HENRY C. FREIST.

In presence of—
WM. C. STRAWBRIDGE,
F. NORMAN DIXON.